United States Patent
Garrido et al.

(10) Patent No.: US 12,026,368 B1
(45) Date of Patent: Jul. 2, 2024

(54) ENHANCED SUGGESTIVE KEYBOARD

(71) Applicant: Healthy Teen Network Inc., Churchville, MD (US)

(72) Inventors: Milagros E. Garrido, Silver Spring, MD (US); Genevieve Martinez Garcia, Potomac, MD (US); Nicholas Sufrinko, New York, NY (US)

(73) Assignee: Healthy Teen Network Inc., Churchville, MD (US)

( * ) Notice: Subject to any disclaimer, the term of this patent is extended or adjusted under 35 U.S.C. 154(b) by 0 days.

(21) Appl. No.: 18/313,981

(22) Filed: May 8, 2023

Related U.S. Application Data

(60) Provisional application No. 63/339,653, filed on May 9, 2022.

(51) Int. Cl.
*G06F 40/56* (2020.01)
*G06F 3/0489* (2022.01)
*G06F 40/274* (2020.01)

(52) U.S. Cl.
CPC .................. *G06F 3/04897* (2013.01)

(58) Field of Classification Search
None
See application file for complete search history.

(56) References Cited

U.S. PATENT DOCUMENTS

2023/0153546 A1* 5/2023 Peleg ............... G06F 3/0482
704/9

\* cited by examiner

*Primary Examiner* — Carl Adams
(74) *Attorney, Agent, or Firm* — Fish & Richardson P.C.

(57) ABSTRACT

In an implementation, text input is received from an enhanced suggestive keyboard executing on a mobile computing device. One or more tokens are generated by dividing the text input. A value corresponding to each known token of the one or more tokens is generated and used to determine model inputs. A corpus discriminator is used to determine how likely it is that the model inputs originate from or approximate a particular corpus. An intended intensity, a demonstrated intensity, and the model inputs, are used to evaluate, using a set of memory-based predictor models, the model inputs against a particular memory-based predictor model for each of the intended intensity and the demonstrated intensity. One or more intended intensity suggestions or one or more demonstrated intensity suggestions are displayed using the enhanced suggestive keyboard.

20 Claims, 9 Drawing Sheets

ENHANCED SUGGESTIVE KEYBOARD

CROSS-REFERENCE TO RELATED APPLICATIONS

This application claims priority to U.S. Provisional Patent Application No. 63/339,653, filed on May 9, 2022, which is incorporated by reference in its entirety.

BACKGROUND

Every day people engage in interactions (for example, social, business, and romantic) using computing devices (for example, mobile phones) where how to respond appropriately to another person in a particular situation may not be known. As a result, inappropriate words may be used in the particular situation, which can cause escalation of tension/anxiety, misunderstandings, damage to relationships, and possible harm to one of the persons.

SUMMARY

The present disclosure describes providing an enhanced suggestive keyboard to improve interactions between individuals using computing devices.

In an implementation, a computer-implemented method, comprises: receiving text input from an enhanced suggestive keyboard executing on a mobile computing device; generating, by dividing the text input, one or more tokens; generating, as generated token values, a value corresponding to each known token of the one or more tokens; determining, based on the generated token values, model inputs; determining, using a corpus discriminator, how likely it is that the model inputs originate from or approximate a particular corpus; evaluating, using a set of memory-based predictor models, an intended intensity, a demonstrated intensity, and the model inputs, the model inputs against a particular memory-based predictor model for each of the intended intensity and the demonstrated intensity; and displaying, using the enhanced suggestive keyboard, one or more intended intensity suggestions of a set of intended intensity suggestions or one or more demonstrated intensity suggestions of a set of demonstrated intensity suggestions.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described approach provides one or more tools to permit communicating individuals to escalate or de-escalate interactions appropriately. Second, an intensity measure of a text conversation can be indicated (for example, using visual cues, audio cues, and/or haptic cues) on an enhanced suggestive keyboard. Third, based on the intensity measure, the described approach can suggest one or more text phrases determined to be appropriate for the particular communication session. Fourth, the described approach permits an individual to choose and output a suggested text phrase to another person (for example, in response to a question/suggestion). Fifth, the described approach can analyze, store information, and update relevant data about one or more communicating individuals in order to permit updates to intensity and text suggestions (for example, in real-time as a conversation evolves over time and/or after a conversation concludes in preparation for a possible future follow-up conversation). Sixth, the described approach can detect and learn when a user's conversation with another individual fails. In future conversations with the user and the individual or with a different individual, the described approach can provide contextual suggestions based on the prior failure to help mitigate/prevent a repeat of the failed conversation.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
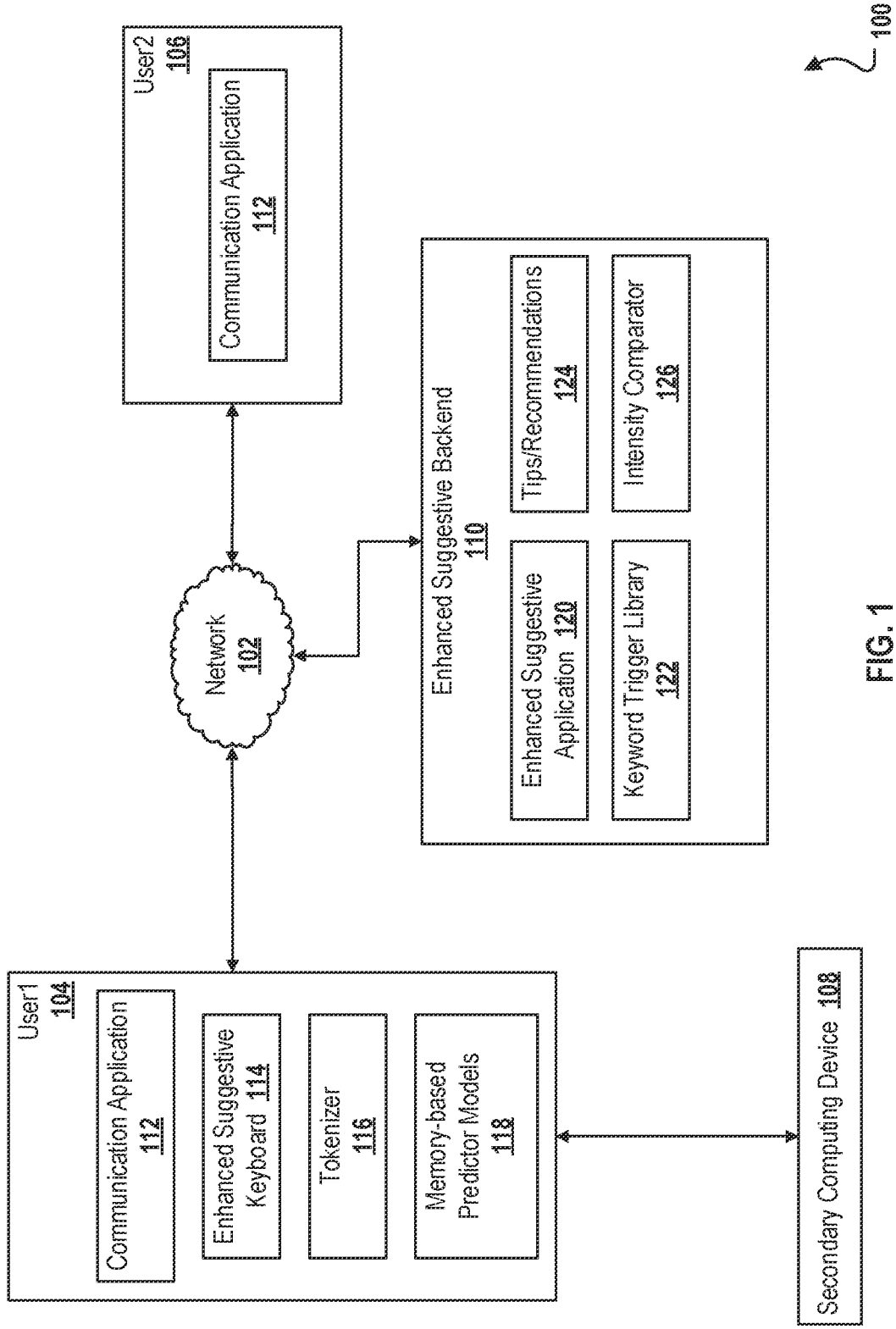
FIG. 1 is a block diagram illustrating an example Enhanced Suggestive System (ESS), according to an implementation of the present disclosure.

The following detailed description describes providing an enhanced suggestive keyboard (ESK) to improve interactions between individuals using computing devices, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

People engage in verbal interactions (for example, using chat applications, telephone, and online meeting software) using computing devices (for example, mobile phones, tablets, and laptop computers), where how to respond appropriately to another person in a particular situation (for example, romantic, social, business, or legal) may not be known/clear to one or both parties. Some specific examples can include two individuals seeking a romantic encounter, a health insurance specialist talking to an angry subscriber, a salesperson interacting with a client, a teacher communicating with a student, or a mediator negotiating a violent hostage situation. As a result, inappropriate words may be exchanged in the particular situation, which can cause escalation of tension/anxiety, misunderstandings, damage to relationships, and possible harm to one of the persons.

The described ESK can be useful to a wide variety of users, including inexperienced individuals, individuals suffering from anxiety, individuals learning new communication techniques, individuals whose native language is other than the one using the ESK, individuals with neurodevelopmental conditions, individuals on the autism spectrum, individuals in high-stress situations, and individuals with different language processing abilities. As will be appreciated by those of ordinary skill in the art, this list of potential users is not exhaustive and other possible uses consistent with this disclosure are possible and considered to be covered by the disclosure. While the disclosure focuses mostly on examples of romantic communication to aid in understanding of the described approach, as will be appreciated by those of ordinary skill in the art, other situations consistent with this disclosure are possible and considered to also be covered by the disclosure.

One example of a particularly difficult situation is where a person tries to assess a level of romantic and/or physical interest of another person through text or voice messaging over computing devices. People express physical and romantic desires, needs, and expectations in a hope to establish intimate (both physical and psychological) connections with another person. Often, people fail at using appropriate words to express desires in a way which corresponds to their actual intentions and to also maintain trust/comfort with the other person (in other words, they "read" and/or respond the other person incorrectly). For example, a sender can unknowingly escalate a perceived sexual intensity of a conversation by sending inappropriate "racy" or explicit words/phrases using a chat-type application, which could result in the recipient feeling that the situation is "moving too fast," the sender is misinterpreting what the receiver is seeking in a relationship at the time, or the received words/phrases are disturbing, frightening, or alarming. This situation can result in the receiver disconnecting from the conversation and wishing for no further communication with the sender.

On the other hand, a person may not feel knowledgeable/comfortable enough to explicitly ask questions related to sexual consent, sexual health, contraception, and sexual parameters for fear of violating trust. The person may also lack experience in or confidence to engage in increasingly flirty or suggestive language with a possible romantic partner.

In these situations, the described ESK can be used as part of an enhanced suggestive system (ESS) application system that can educate individuals/suggest appropriate responses to complex situations in real-time. The ESS can use artificial intelligence to analyze data (for example, textual, voice, emails, and chats) based on specific classifiers to provide: 1) a suggested response (for example, using text- or other media-based output (such as, audio, video, animations, haptics, graphics, and vibration) and 2) relevant contextual data for information/educational purposes.

FIG. 1 is a block diagram illustrating an example ESS 100, according to an implementation of the present disclosure. In FIG. 1, the Enhanced Suggestive System 100 includes a Network 102, two users (User1 104 and User2 106), a Secondary Computing Device (SCD) 108 associated with User1 104, and an Enhanced Suggestive Backend (ESB) 110. Other elements, data types, and aspects of each of these components may not be represented with respect to FIG. 1, but will be introduced and described in association with later FIGS.

User1 104 and User2 106 are envisioned as a computer device (for example, laptop, tablet, smart phone, smart watch, smart glasses, augmented reality (AR)/virtual reality (VR) headset and/or other device running the Communication Application 112, ESK 114, and/or other applications). However, it should be noted that other computing devices could also be considered to be User1 (for example, headphones/earbuds and smart speakers, either individually or in combination with one or more other computing devices). For example, User1 104 could be a smart phone connected to a SCD 108 (such as, a smartwatch or wireless earbuds) using a Bluetooth connection. In some implementations, more than one SCD 108 can be associated with a user computing device.

As illustrated in FIG. 1, User1 104 and User2 106 both include a Communication Application 112. In the example of FIG. 1, User1 includes an ESK 114, but User2 106 does not. In some implementations, both users can include an ESK 114.

In some implementations, the ESK 114 operates as a controlling application, managing operations, communications, and data storage, processing, and retrieval with respect to the User1 104 and the ESB 110. For example, the ESK 114 can communicate with the ESB 110 to receive tips/recommendation for display to a user of the ESK 114.

In some implementations, the ESK 114 is a third-party keyboard that integrates into application software (for example, Communication Application 112) to support a user in contacting/responding to other users appropriately in complex and sensitive communicative situations. In some implementations, Communication Application 112 can include, among other applications, chat applications, text/instant-messenger applications (including SMS, MMS, and custom messaging applications), visual calling applications, browsers, and social media applications. In some implementations, the ESK (114) is downloaded from an "App"-type store for installation and deployment on User1 104. In some implementations, the ESK 114 can be configured to integrate with Communication Application 112 (and other, non-illustrated, communication-type applications) using Application Programming Interfaces (APIs) or other communicative methods as known to those of ordinary skill in the art. In some implementations, the ESK 114 can also establish communication with the ESB 110 and associated components using Network 102 or other communication methods.

In some implementations, the ESK 114 can be configured to communicate with other ESKs directly or using the ESB 110 to provide data useful for educating a communicating user by suggesting appropriate responses and other contextual information. For example, in a dual ESK 114 user scenario, one ESK 114 could indicate to a different ESK 114 that the user is hesitant in responding or writing and is deleting and re-writing a response multiple times. This information could be used by the ESS 100 to prompt the hesitant user with a comforting or positive/encouraging message or to ask if they have any specific concerns or worries.

The ESK 114 is configured to gather user data (such as, voice, text, and other data—that is, linguistic and non-linguistic user inputs) from users on the previously mentioned computing devices when users type, speak, or otherwise input data into a computing device while using a variety of the previously described (or other) Communication Applications 112. In some implementations, individuals must provide permissions (due to legal/regulatory/privacy/security reasons) to the ESK 114 to access verbal, text, and other digital data. For example, a user can use the operating system of their computing devices and built-in security/permissions functionality to provide necessary access to the verbal, text, and other data for the ESK 114. Depending on what data sources a user permits the Enhanced/suggestive Keyboard 114 to access, overall ESS 100 functionality may be affected (that is, more data may provide more complete/appropriate suggestions and contextual information).

User data is scored, classified, analyzed, and displayed according to classifiers that are determined by the situation the user needs support in (for example, romantic or business situations). User data is also anonymized, aggregated, organized, and used for model training. In some implementations, the classifiers are scored based on intensity levels (for example, intended intensity and demonstrated intensity—to be described below).

With respect to a romantic/intimate/sexually-focused use of the described approach, at a high-level, the ESS 100 classifies and/or scores the user data according to an intensity scale (for example, "friendly," "flirty," "sexy," or "kinky"—with each respective intended intensity from left to right providing words/phrases and tips as the user types that are more sexually explicit) that corresponds to a user-set intended intensity scale. In some implementations, other scales/vectors can be used (for example, "casual language" to "jargon" (such as, for a keyboard focused on professional contexts) or "literal" to "figurative" language (such as, for a keyboard focused on people with autism spectrum disorder). In some implementations, one or more scales can be combined (for example, "friendly"-"flirty"-"sexy"-"kinky" and "literal"-"figurative").

The ESS 100 uses the ESK 114 to display a demonstrated intensity score (that is, what the user's actions actually translate into with respect to intensity), enable users to set/change their intended intensity, and to permit the ESS 100 to suggest text responses and tips aligned with the intended and demonstrated intensities. This assists users to navigate/respond appropriately in complex and sensitive situations to other users during conversations about sex and intimacy. In some implementations, the words/phrases and tips may be shown at the time the intended intensity is set (for example, to permit a "cooling off" period) or at a later time (for example, to ease/smooth a transition into a higher intended intensity level).

Users with an ESK 114 also include a Tokenizer, which, in some implementations, contains a database of multiple (for example, 10,000) common language (for example, English) tokens and associated token values. A token refers to a sequence of characters that represents a single unit of meaning, usually, though not necessarily exclusively, words. The tokenizer breaks text input received from the ESK 114 into individual tokens and generates token values for each known token (referring to tokens included in the database of multiple common language tokens). For example, if the received text input is "it would be super fun if you," the tokenizer can break the phrase into seven tokens (that is, one for each word), each of the seven tokens into token values (for example, the set [6, 39, 17, 354, 264, 23, 4], respectively), where 6 is the token value referring to the token "it", 39 is the token value referring to the word "would," and so on. Note that in this example, there are no unknown tokens, although that is a possibility.

Users with an ESK 114 also include Memory-based Predictor Models 118. In some implementations, the Memory-based Predictor Models 118 are a set of Long/Short-Term Memory (LSTM)-based predictor models, which is a series of neural network, machine-learning (ML) models collectively containing of two or more corpora inclusive of everyday and intimacy-related language.

For example, the Memory-based Predictor Models 118 can be a set of twelve models, each representing a range within a corpora scoring scale (for example, scaled from −5 for "hate talk" to +6 for "very explicit and/or super-hot statements"). In some implementations, more or less than twelve models may comprise the set of LSTM-based predictor models and the corpora scoring scale may represent different vectors.

In an implementation, indicated intensity and demonstrated intensity each range on a scale from 0 to 100 and correspond to a subset of models on a continuum of "Cooling off and/or expressing lack of interest" to "very explicit and/or super-hot statements" (for example, −1 to +6 on the previously described corpora scoring scale). In other implementations, the subset of models corresponding to indicated and demonstrated intensities may include more or less models, for example models representing corpora scoring values from −3 to 5. Note that excluding some models from the subset of models corresponding to indicated and demonstrated intensities minimizes a likelihood that the ESS 100 suggests language considered problematic.

For example, in some implementations, the Memory-based Predictor Models 118 can comprise:
  6: Very explicit and/or super-hot statement,
  5: Explicit, sexy, and/or kinky statement,
  4: Flirty, teasing, and playful statement,
  3: Statement showing sexual or romantic interest,
  2: Sex related statements (feelings, facts, no directed to a person in particular),
  1: Romantic (non-sexual) and/or relationships related statement,
  0: Routine conversation (or "convo")) (no related to sex and/or relationships),
  −1: Cooling off and/or expressing lack of interest statement,
  −2: Unfriendly statement,
  −3 Strong rebuffing statement,
  −4 Strong negative statement reflecting criticism and/or complaint, and
  −5 Hate talk.

As an example of use, text input of "You've got nice boobs fullstop" could be classified under model 4 or 5. As another example, text input of "I had such a good dream about you last night" could be classified under model 1. A still further example of text input of "It will either work out or it won't" could be classified under model −1.

In some implementations, User1 104 can contain one or more artificial intelligence (AI/ML) engines and associated models for use in operations associated with User1 104. As will be appreciated by those of ordinary skill in the art, the one or more AI/ML engines and associated models can be used to support operations on or between User1 104 and the ESB 110.

In some implementations, the ESB 110 includes an Enhanced Suggestive Application (ESA) 120, Keyword Trigger Library 122, Tips/Recommendations 124 (or "tip"/ "tips"), and an Intensity Comparator 126.

The ESA 120 operates as a controlling application, managing operations, communications, and data storage, processing, and retrieval with respect to the ESB 110 and User1 104. For example, the ESA 120 can communicate with the ESK 114 to transmit tips/recommendation for display to a user of the ESS 114.

In some implementations, the ESA 120 can contain one or more AI/ML engines and associated models (for example, the Memory-based Predictor Models 118) for use in operations associated with the ESB 110. As will be appreciated by those of ordinary skill in the art, the one or more AI/ML engines and associated models can be used to support operations on or between the ESB 110 and User1 104.

The Keyword Trigger Library 122 is a set of reference words/phrases (for example, tens of thousands of words/phrases) and associated intended intensity ranges (for example, the previously described "friendly," "flirty," "sexy," or "kinky") on a scale of 1 to 100 that can indicate that a user might benefit from additional support in their communications. For example, if ESK 114 text input matches a keyword in the Keyword Trigger Library 122 and its associated intended intensity range, a tip can be offered to the user. In some implementations, fuzzy matching can be used to determine whether text input is similar to a phrase within the Keyword Trigger Library 122. Here, too, a tip is offered to the user if the intended intensity is also matched. In other implementations, demonstrated intensities can also be associated with keyword phrases.

As an example, if the text input contains the token "clean" and an intended intensity score of 51 to 100 (corresponding to "sexy" or "kinky"), the ESS 100 might conclude that user might be asking about HIV and STI status (that is, the question "Are you clean?" in the context of sex typically refers to whether or not someone has a sexually transmitted infection, often to determine the relative safety of engaging in sexual activity with or without the use of a barrier method, such as a condom). In this case, a tip will be generated. If the text input contains the same token "clean" and an intended intensity of 1-25 (corresponding to "friendly"), the user might instead be using "clean" in a more everyday content. In that case, a tip is not generated. In some implementations, if the text input and intended intensity matches to multiple tips, one is offered at random.

Tips/Recommendations 124 are messages sent to the ESK 114 when a match is established in the Keyword Trigger Library 122 with tokens from text input and intended intensity (and, in some implementations, demonstrated intensity). In some implementations, a tip consists of two parts: 1) title and 2) content, where the title replaces one or more suggestions in a set of intended intensity suggestions (described below) and/or in a set of demonstrated intensity suggestions (described below) in the ESK 114. In this implementation, tapping the title in the ESK 114 can open the content on the ESK 114.

Continuing with the previous example with a text input containing the token "clean" and an intensity score of 51 to 100, a tip is generated with the title "Protection?" because of a positive match within the Keyword Trigger Library 122. Upon tapping the title "Protection," the following content can appear in the ESK 114: "How do you ask a partner if they've been tested? Share your own experience first: how often you've been tested, what statuses you've had. Many couples can bond by getting tested together. It's all about knowing your body, and when it comes to sex, knowing is growing." For a similar example with a tip of "Safety Talk", please refer to FIGS. 4 and 5.

The Intensity Comparator 124 can be used to compare both intended intensity and demonstrated intensity of a second user (not illustrated) analogous to User1 104 and also using an ESK 114. For example, if intended intensities differ between User1 104 and the second user, a graphical indicator can be displayed on the ESK 114 to indicate to one or more of the users what the other user's settings are for context or to provide an indicator that the other user's intended intensity is either higher or lower (such as, with an up or down facing arrow). As another example, if the intended intensity of User1 104 and the demonstrated intensity of the second user match (for example, User1 104 intended intensity=30 and second user demonstrated intensity=30; Difference 30-30=0), both users can each be notified by a graphical indicator (such as a star) on the ESK 114 and a tip that can read "Flirting can be a tricky thing to master, but you're hitting all the right notes! No doubt, they're already impressed by your charm and wit. Keep the conversation flowing and continue to be intentional with your flirting. Who knows where it might lead!" In cases where there is a difference between intended intensity and demonstrated intensity, other actions and/or indications can occur consistent with this disclosure.

The ESS 100 progressively learns from each user and provides outputs (for example, word/phrases and tips using the ESK 114) based on a particular user's conversation style. Anonymized data particular to each user can be stored with respect to the ESB 110 (or other application/data store associated with the ESB 110, although not illustrated) and/or the ESK 114.

In some implementations, the ESS 100 is configured to in a manner which permits ease-of-use by disabled individuals (for example, visually impaired or hearing impaired). For example, for visually impaired individuals, provided auditory/haptic cues can be used with or in addition to visual cues. For hearing impaired individuals, use of visual/haptic cues instead of auditory cues can be leveraged.

Figure 2:
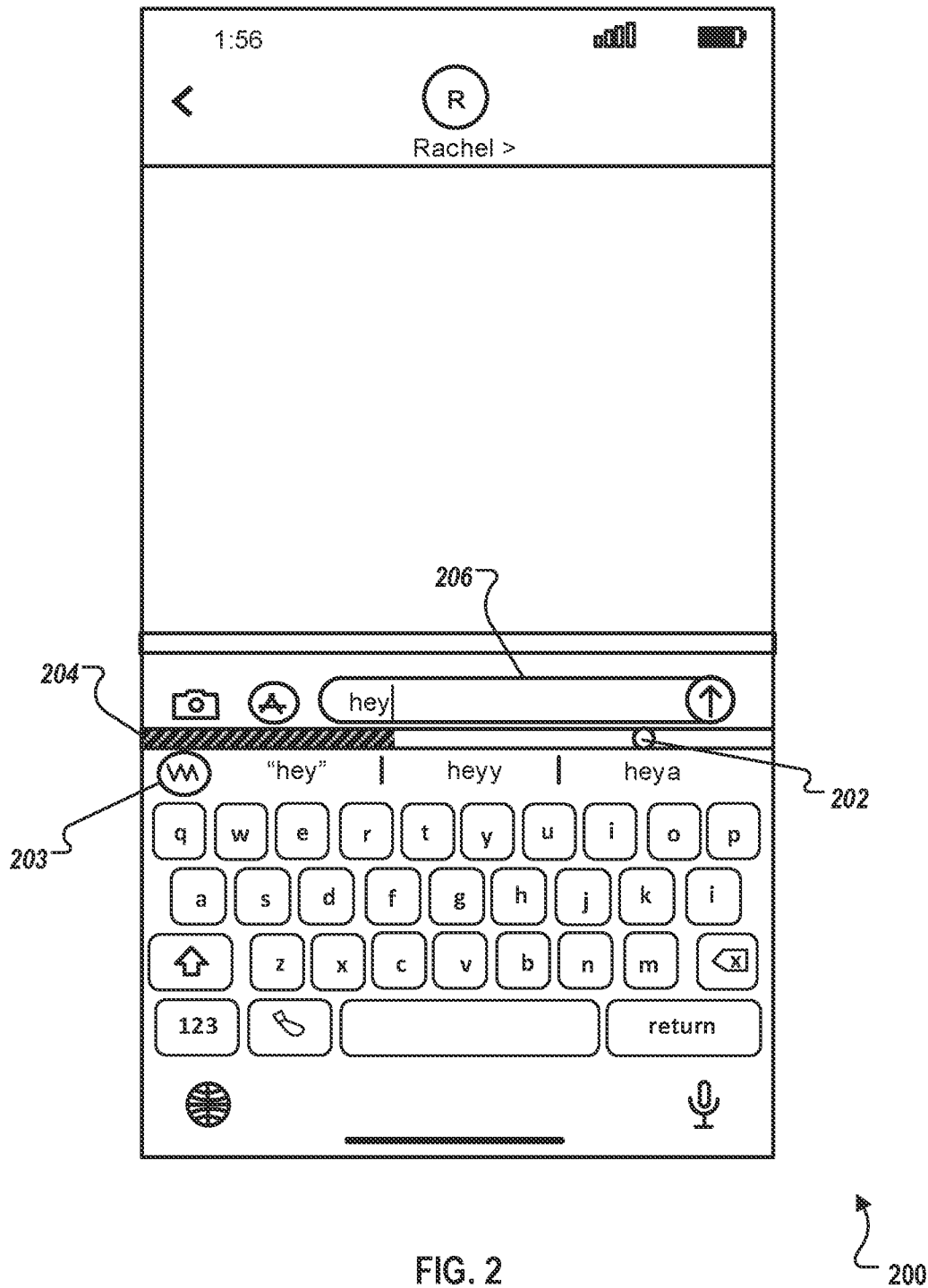
FIG. 2 is an illustration of a sample user interface where an Enhanced Suggestive Keyboard (ESK) is in use, according to an implementation of the present disclosure.

FIG. 2 is an illustration of a sample user interface 200 where an ESK 114 is in use, according to an implementation of the present disclosure. Here, the ESK 114 gathers text input entered by users, classifies and scores the text input according to a set intended intensity, and displays a demonstrated intensity score.

As illustrated in FIG. 2, an intended intensity setting can be set using a slider 202. As an example, sliding the slider 202 from left to right can increase an overall intended intensity from "friendly" on the left to "kinky" on the right (using the previous example scale of "friendly," "flirty," "sexy," or "kinky" on a scale of 0 to 100, respectively). Here, slider 202 appears to be set to between "sexy" and "kinky." Therefore, if the user places the slider 202 in the first quarter of the meter (scores 1 to 25), it is indicated that the intended intensity is "friendly"; if the slider is in the second quarter (scores 26 to 50), it is indicated as "flirty", and so on. In some implementations numerical scores can also be displayed to users. Note that words/phrases and tips are suggested on a continuum-like scale, sequence or range.

Placing the slider 202 at a position with a value of 10 will produce a different set of words/phrases and tips than placing the slider at a position with a value of 20, even though "friendly" is displayed for both intended intensities. Practically, the user will get a lot of repeats between the two scores, but the higher score will have just a few "hotter" words/phrases and tips sprinkled in tips/suggestions. In some implementations, other qualitative indicators could be mapped to slider 202 (for example, "uninterested" or "raunchy").

Note that the slider 202 can be locked in place using a favicon/logotype (here a "W"-like symbol) 203 on the ESK 114. This is to prevent the slider 202 from being accidentally tapped and adjusted when users are typing quickly. For example, a tap can lock the slider 202 and another tap can unlock the slider 202. In some implementations, a locked and unlocked state can be indicated by a different color, shading, and/or modification of the favicon/logotype 203.

The user's demonstrated intensity score is represented by dynamic meter 204. As can be seen, dynamic meter 204 is representing a demonstrated intensity score based on the word "hey" being typed into the message input field 206. In this example, "heyy" or "heya" could be seen as more sexually intense, and could raise the demonstrated intensity score if typed in instead of a the more generic word "hey."

As an example, if a user intends to be "friendly" but is actually demonstrating "sexy," the ESK 114 shows a discrepancy between the intended intensity setting ("friendly" on the slider 202) and the demonstrated intensity ("sexy" on the dynamic meter 204). In this case, the ESK 114 can provide words/phrases and tips to "cool down" or an option/recommendation to change the intended intensity to something closer to "sexy," like "flirty." In some implementations, audio cues and/or haptic cues could also be used to indicate one or more of the intended intensity or demonstrated intensity.

In some implementations, an intended intensity can be left unset. In this case, words/phrases and tips are suggested based on the demonstrated intensity. This means that intended intensity overrides suggested words/phrases and tips that result from demonstrated intensity.

In some cases, the ESS 100 can dynamically alter the intended intensity based on user inputs. In some cases, the ESS 100 can set an intended intensity based on, for example, historical data, users being communicated with, prior intended intensity settings based on particular user inputs detected, or other approaches consistent with this disclosure. In some cases, the ESS 100 can leave the intended intensity unset or at a default value (for example, at a lowest value) and prompt a user whether they wish to alter the intended intensity while using the ESK 114.

Figure 3:
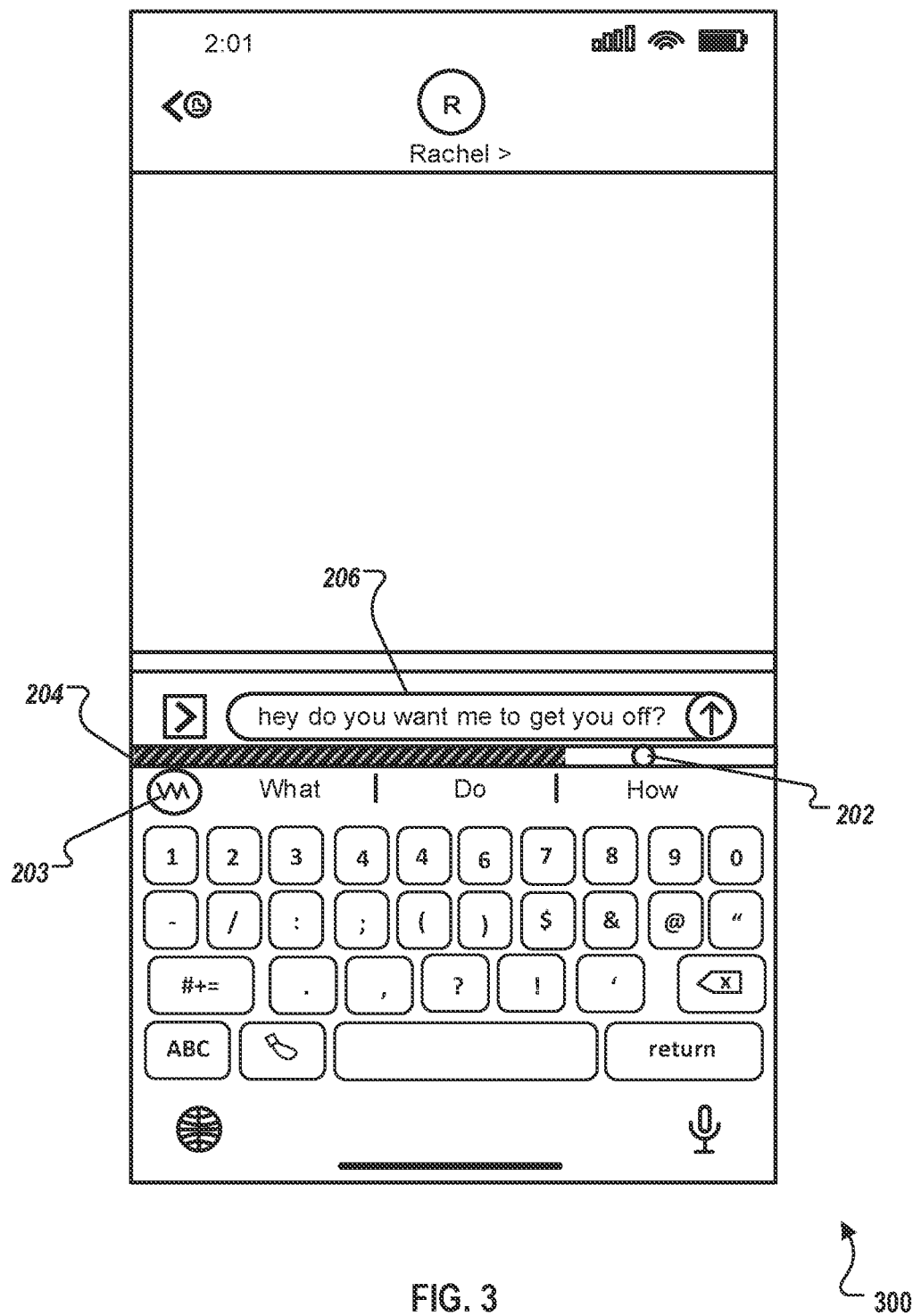
FIG. 3 is an illustration of a sample user interface where an ESK is in use and differing entered text has increased a determined intensity score, according to an implementation of the present disclosure.

FIG. 3 is an illustration of a sample user interface 300 where an ESK is in use and differing entered text has increased a determined intensity score, according to an implementation of the present disclosure. As illustrated, the text "do you want me to get you off" has been added in message input field 206 to the word "hey" entered in FIG. 2. As a result, the determined intensity score displayed by dynamic meter 204 has increased in value compared to the determined intensity value shown in FIG. 2.

Figure 4:
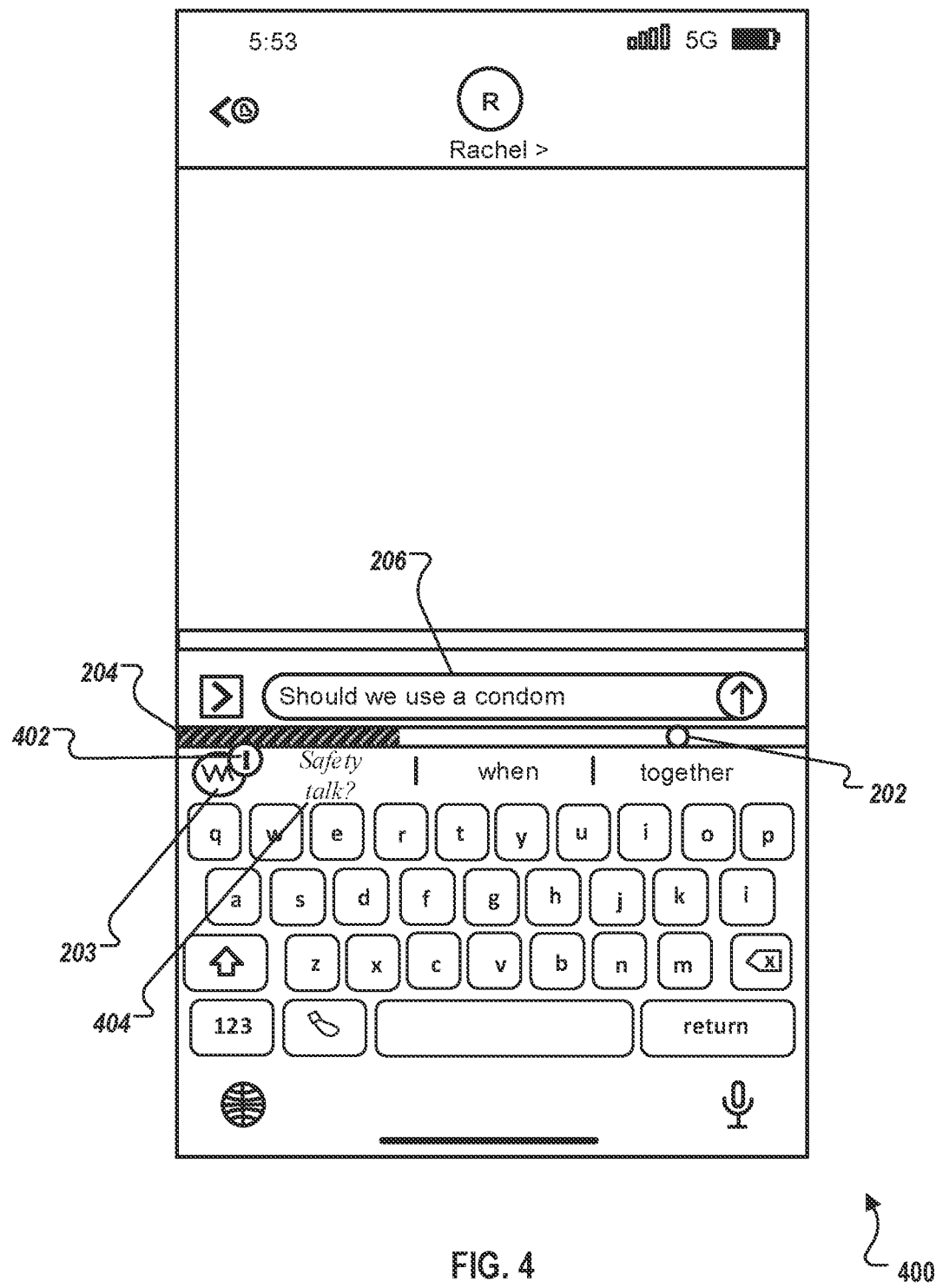
FIG. 4 is an illustration of a sample user interface where an ESK is in use and an entered term(s) has triggered a tip for review.

FIG. 4 is an illustration of a sample user interface 400 where an ESK 114 is in use and an entered term(s) has triggered a tip for review, according to an implementation of the present disclosure. In FIG. 4, one or more tokens determined from the phrase "Should we use a condom" in message input field 206 has triggered a tip notification 402 icon corresponding to a "safety talk", which is presented to the user as link 404 ("Safety talk"). If the text 404 is selected, the ESK 114 is modified to resemble the user interface illustrated in FIG. 5.

Figure 5:
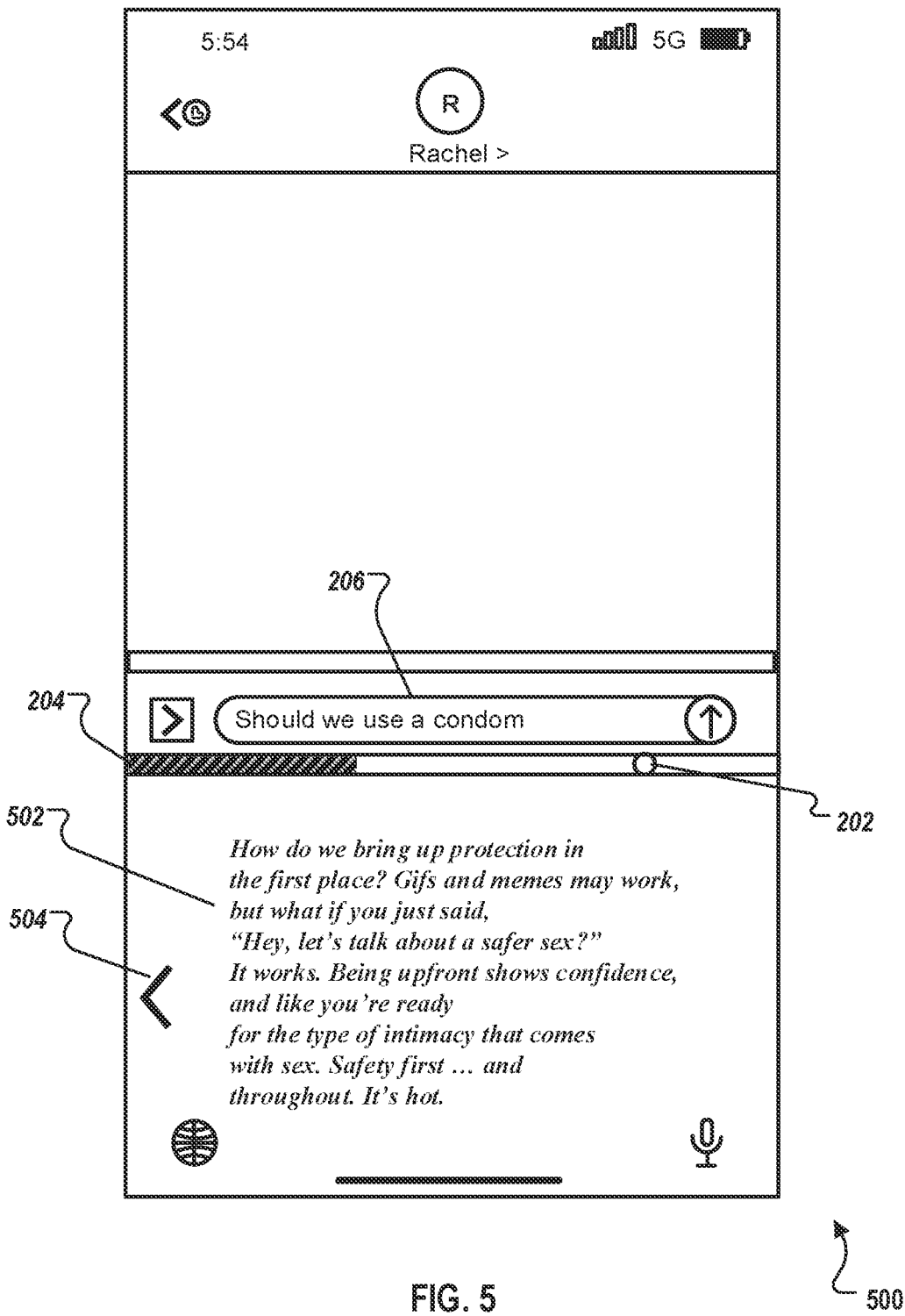
FIG. 5 is an illustration of a sample user interface where an ESK is in use and a user has selected a triggered tip for review, according to an implementation of the present disclosure.

FIG. 5 is an illustration of a sample user interface 500 where an ESK 114 is in use and a user has selected a triggered tip for review, according to an implementation of the present disclosure. As illustrated in FIG. 5, following selection of the text 404 from FIG. 5, tip 502 has been displayed for review: "How do we bring up protection in the first place? Gifs and memes may work, but what f you just said, 'Hey, let's talk about a safer sex?" It works. Being upfront shows confidence, and like you're ready for the type of intimacy that comes with sex. Safety first . . . and throughout. It's hot." To return to the user interface as in FIG. 4, the return arrow 504 is selectable.

As another example, if keywords related to a desire to talk about exclusive relationships are entered, such as "exclusive," "relationship," "closed," "casual," "open," "close," and "exclusive," the ESK 114 can provide a tip from a series of tips. For example, the tip provided may be one of the following, selected randomly, if the user-provided intensity score is near a value x: "What if you really want to tell someone you want to be exclusive? This can be scary, especially if you're not sure they have the same feelings. But you'll never know if you don't bring it up and you can't be in a relationship that doesn't make you feel comfortable. So, take some deep breaths, and speak your truth." Alternatively, if the user-provided intensity score is y, the tip may be: "Want to be long-term committed to someone? Or they want that of you? Great. But, it also takes communication and trust, and having that first conversation that says, 'I really want to be in a long-term committed relationship with you,' shows you are ready for that type of relationship.'"

Returning to FIG. 1, in some implementations, the ESS 100 is configured to in a manner which permits ease-of-use by disabled individuals (for example, visually impaired or hearing impaired). For example, for visually impaired individuals, provided auditory/haptic cues can be used with or in addition to visual cues. For hearing impaired individuals, use of visual/haptic cues instead of auditory cues can be leveraged.

Figure 6A:
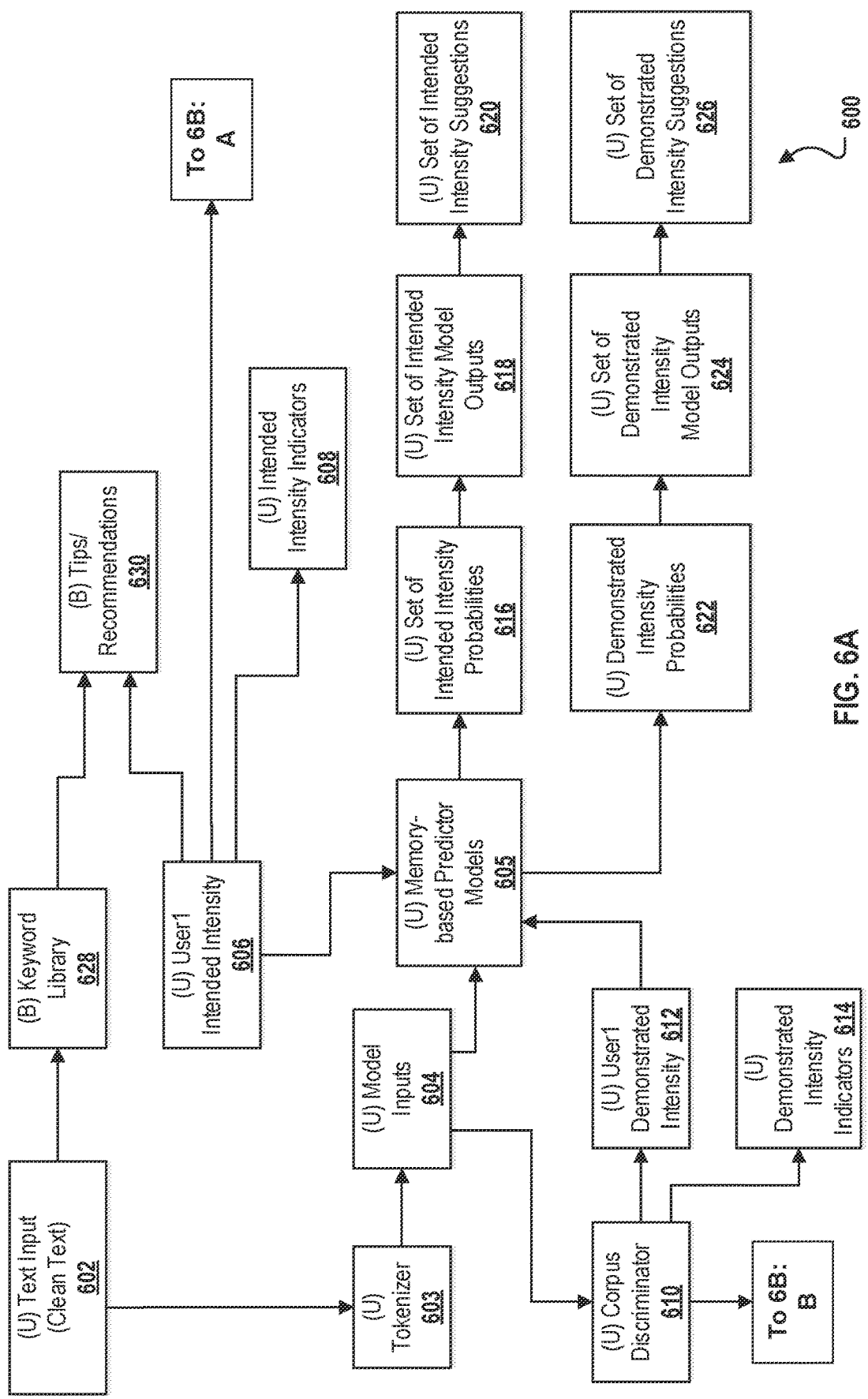
FIGS. 6A-6C are block diagrams illustrating an example of a data flow in the ESS, according to an implementation of the present disclosure.
Figure 6B:
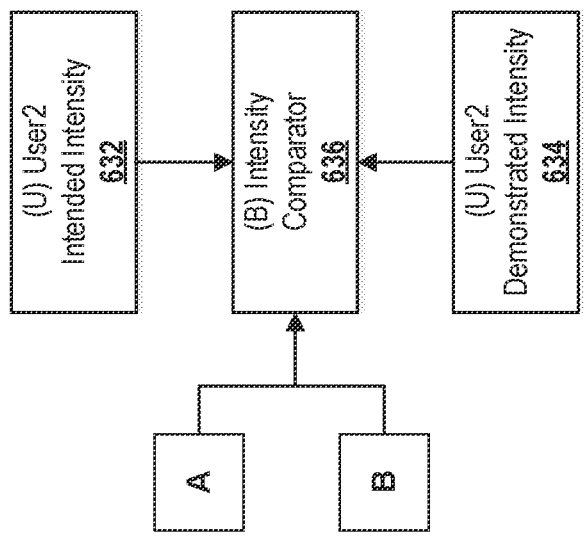
Figure 6C:
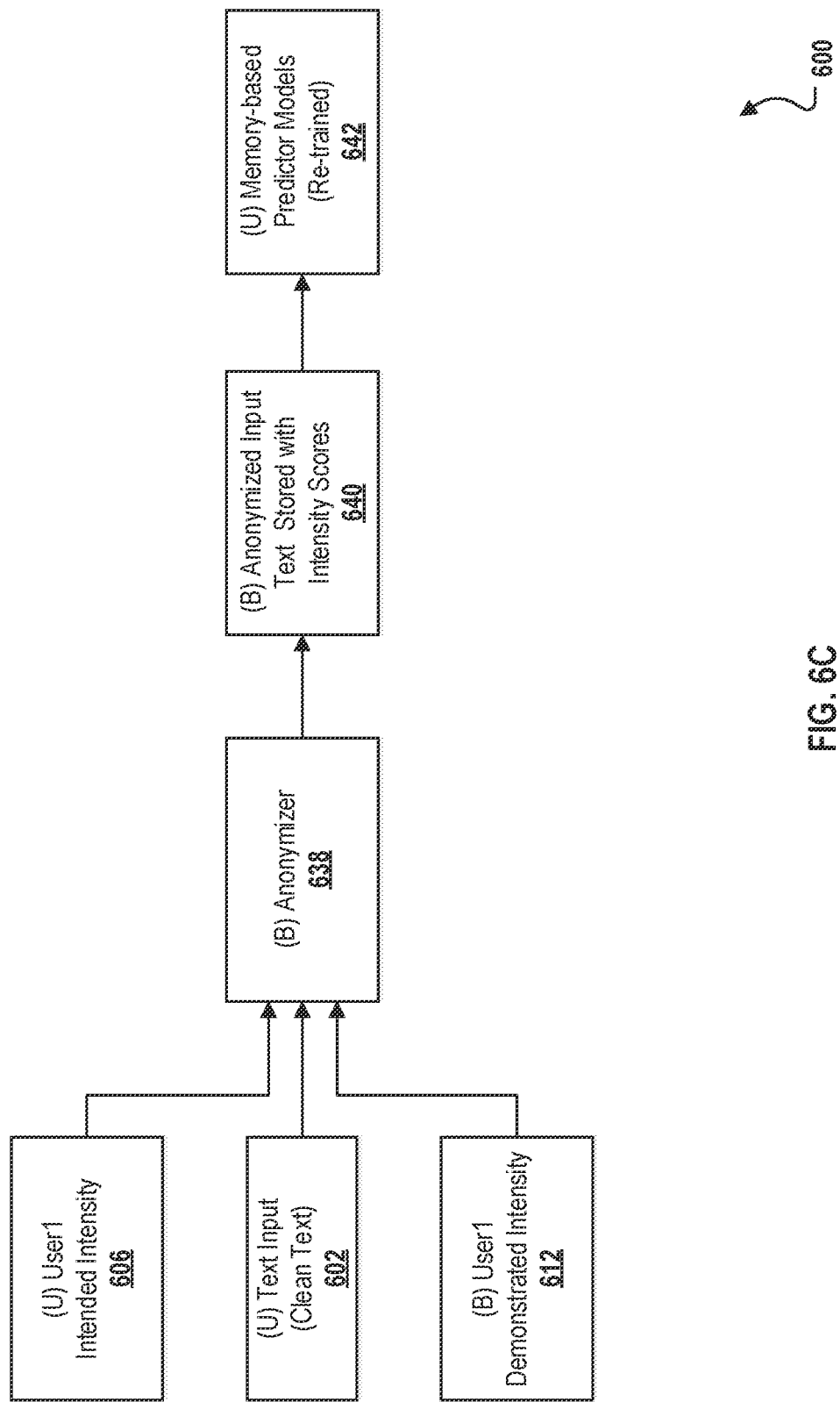

FIGS. 6A-6C are block diagrams illustrating an example of a data flow 600 in the ESS 100, according to an implementation of the present disclosure.

In FIGS. 6A-6C, "(U)" indicates on a user device (for example, User1 104) and "(B)" indicates on the ESB 110. In other implementations, elements on User1 104 can instead be implemented on and ESB 110 and vice versa.

For clarity of presentation, the description that follows generally describes data flow 600 in the context of the other figures in this description. However, it will be understood that data flow 600 can be performed, for example, by any system, environment, software, and hardware, or a combination of systems, environments, software, and hardware, as appropriate. In some implementations, various steps of data flow 600 can be run in parallel, in combination, in loops, or in any order consistent with this disclosure.

In the illustrated example, in FIG. 6A, the ESS 100 includes operations related to Text Input (Clean Text) 602, a Tokenizer 603, Model Inputs 604, User1 Intended Intensity 606, Intended Intensity Indicators 608, a Corpus Discriminator 610, User1 Demonstrated Intensity 612, Demonstrated Intensity Indicators 614, Memory-based Predictor Models 605, a Set of Intended Intensity Probabilities 616, a Set of Intended Intensity Model Outputs 618, a Set of Intended Intensity Suggestions 620, a Set of Demonstrated Intensity Probabilities 622, a Set of Demonstrated Intensity Model Outputs 624, a Set of Demonstrated Intensity Suggestions 626, a Keyword Library 628, and Tips/Recommendations 630.

In FIG. 6A, at 602, Text Input (Clean Text) is received by the ESK 114. In some implementations, the Text Input (Clean Text) includes alphanumeric and emoji characters a user types in a message input field (for example, message input field 206). Such message input fields are commonly, though not exclusively, located immediately above a user's keyboard on many communication applications. For example, a user may type the phrase "it would be super fun if you" in a message input field on a communication application. From 602, data flow 600 proceeds to 603 and 628.

At 603, as previously described, a Tokenizer (for example, Tokenizer 116) divides the Text Input to generate individual tokens. The Tokenizer generates token values corresponding to each known token. From 603, data flow 600 proceeds to 604.

At 604, Model Inputs are determined from the generated token values at 603. In some implementations, the model inputs are the last five token values. In other implementations, greater or fewer than five token values may be used as the Model Inputs. Continuing with the previous described example with Text Input "it would be super fun if you," the Model Inputs would be a set [17, 354, 264, 23, 4]. From 604, data flow 600 proceeds to 605 and 610.

At 606, a User1 Intended Intensity is determined. As previously described, the Intended Intensity is a user-set value from 1 to 100 that the user wishes to achieve in a given conversation. The Intended Intensity is set by the user (for example, set by the user through tapping and/or dragging a slider (such as, slider 202)). Continuing with the previous example, the Intended Intensity values correspond to Intended Intensity descriptors: "friendly" for values 1 to 25, "flirty" for values 26 to 50, "sexy" for values 51 to 75, and "kinky" for values 76 to 100. In this example, the user sets the intended intensity to 30, which corresponds to the intended intensity descriptor "flirty." From 606, data flow 600 proceeds to 605, 608, 630, and to 636 (in FIG. 6B).

At 608, Intended Intensity Indicators are determined. Intended Intensity Indicators are cues, including visual, auditory, and/or haptic cues, that make apparent or hint to a user the Intended Intensity. Continuing with the previous example, the Intended Intensity indicators can include, but are not limited to, a slider (such as, slider 202) positioned at 30 for "flirty," a color-tinted keyboard (for example, purple), and light vibrations whenever any keyboard key is tapped on the ESK 114. In another example, the Intended Intensity Indicators can include a slider at position 90 for "kinky," a red and black-tinted keyboard, and strong vibrations whenever any keyboard key is tapped.

At 610, a Corpus Discriminator is a type of model trained to distinguish between two or more different corpora (plural of "corpus"), a large body of text generated by many individuals. The goal of the Corpus Discriminator is to learn to identify unique patterns and characteristics of each corpus, so that it can classify new Text Input data as belonging to one corpus or another. The Corpus Discriminator predicts how likely it is that the Model Inputs originate from or approximates an intimacy-related corpus (in comparison to an everyday corpus). Continuing with the previous example, the Corpus Discriminator determines how likely the Model Inputs of [17, 354, 264, 23, 4] originate from or approximate the intimacy-related corpus. From 610, data flow 600 proceeds to 612, 614, and 636 (in FIG. 6B).

At 612, a User1 Demonstrated Intensity is determined. The Demonstrated Intensity is a probability the Model Inputs originate from or approximate the intimacy-related corpus. Continuing with the previous example, the Corpus Discriminator determines the Model Inputs of [17, 354, 264, 23, 4] have a Demonstrated Intensity of 0.20. This value indicates that the phrase "be super fun if you" is significantly more likely to originate from or approximate the everyday corpus in comparison to the intimacy-related corpus. From 612, data flow 600 proceeds to 605.

At 614, Demonstrated Intensity Indicators are determined. Demonstrated Intensity Indicators are cues, including visual, auditory, and/or haptic cues that make apparent or hint to the user the Demonstrated Intensity Score of their Text Input. The Demonstrated Intensity Indicators are dynamic, meaning as tokens are removed/added, the Demonstrated Intensity Indicators change. Continuing with the previous example, the Demonstrated Intensity Indicators include, but are not limited to, a meter (for example, dynamic meter 204) 20 percent filled and 80 percent empty, indicating that the Text Input is more closely associated with the "friendly" limit than the user-set "flirty" Intended Intensity limit (recall that in the previous example, the user set the Intended Intensity slider to the position 30 for "flirty"). As the user continues to type or select suggestions, the Demonstrated Intensity Indicators can change in real-time.

At 605, the previously described Memory-based Predictor Models (for example, Memory-based Predictor Models 118) process data from 604, 606, and 612. Within the Memory-based Predictor Models, the Model Inputs from 604 are evaluated corresponding to the User1 Indicated Intensity from 606 and the User1 Demonstrated Intensity from 612. Continuing with previous example, the Model Inputs of [17, 354, 264, 23, 4] can be evaluated by a model corresponding to a corpora scoring value of +1 for "romantic (non-sexual) and/or relationship-related statements" for the User1 Indicated Intensity of 30 (or "flirty") and by the model corresponding to a to a corpora scoring value (previously described with respect to the Memory-based Predictor Models 118) of 0 for "routine conversation" for the User1 Demonstrated Intensity of 20 (or "friendly"). From 605, data flow 600 proceeds to 616 and 622.

At 616, a Set of Intended Intensity Probabilities are determined. The Set of Intended Intensity Probabilities includes probabilities of three most probable next tokens according to the model corresponding to the Intended Intensity. In other implementations, the probabilities of greater or fewer than three tokens may be identified. Continuing with the previous example, the Model Inputs of [17, 354, 264, 23, 4], when evaluated by the model corresponding to a corpora scoring value of +1 for "romantic (non-sexual) and/or relationship-related statements," can be the set of [0.0014, 0.0012, 0.008]. From 616, data flow 600 proceeds to 618.

At 618, a Set of Intended Intensity Model Outputs is determined. The Set of Intended Intensity Model Outputs includes identifiers of token values corresponding to the three most probable next tokens from a possible list of multiple (for example, 10,000) common language (for example, English) tokens. In other implementations, the identifiers of token values of greater or fewer than three tokens may be identified in this set. Continuing with the previous example, a Set of Intended Intensity Probabilities of [0.0014, 0.0012, 0.008] from 616 can correspond to a Set of Intended Intensity Model Outputs of [32, 27, 63]. From 618, data flow 600 proceeds to 620.

At 620, a Set of Intended Intensity Suggestions is determined. The Set of Intended Intensity Suggestions includes text or emoji suggestions corresponding to the Set of Intended Intensity Outputs. In some implementations, the Set of Intended Intensity Suggestions can be displayed on the ESK 114 (for example, above the alphanumeric keys). The user may select one of the Set of Intended Intensity Suggestions or select none. Continuing with the previous example, the Set of Intended Intensity Suggestions can correspond to the Set of Intended Intensity Outputs [32, 27, 63] from 618, which can correspond to the words "can," "are," and "know," respectively). If the user selects the Intended Intensity Suggestion "can," the Text Input can expand in the message input field 206 to "it would be super fun if you can." The Model Inputs can then adjust accordingly and the data flow 600 proceeds accordingly (for example, from the Model Inputs 604).

At 622, 624, and 626, a Set of Demonstrated Intensity Probabilities, a Set of Demonstrated Intensity Model Outputs, and a Set of Demonstrated Intensity Suggestions, respectively, are determined similarly to 616, 618, and 620, except using the model corresponding to the User1 Demonstrated Intensity from 612.

At 628, a determination is made if the Text Input matches a keyword in the previously described Keyword Library (for example, Keyword Library 122) and an associated intended intensity range to the keyword. From 628, data flow 600 proceeds to 630.

At 630, one or more previously described Tips/Recommendations (for example, Tips/Recommendations 124) are offered to the user based on whether the Text Input matches a keyword in the Keyword Library from 628 and the User1 Intended Intensity from 606.

Turning to FIG. 6B, FIG. 6B is a block diagram illustrating a continuation of FIG. 6A of the data flow 600 in the ESS 100, according to an implementation of the present disclosure.

In FIG. 6B, the ESS 100 includes operations related to User2 Intended Intensity 632, User2 demonstrated Intensity 634, and Comparative Indicators 636.

At 632 and 634, User2 Intended Intensity and User2 Demonstrated Intensity, respectively, are the Intended Intensity and Demonstrated Intensity for the receiver (User2) of User1's messages. In some implementations, one approach could include having the ESS 100 maintain a unique identifier for each user of the ESK 114, which would be stored on the user's device and sent along with any messages. When a recipient receives the message, their device could detect the unique identifier and identify the sender as someone who also has the ESK 114 installed. In this implementation, the User2 Intended Intensity and the User2 Demonstrated Intensity could be sent to User1. Here, the User1's ESK 114 could take into account the knowledge of the User2 Intended Intensity and the User2 Demonstrated Intensity with respect to Tips/Recommendations (for example, the ESK 114 could let User1 know of a difference between User1 and User2 Intended Intensities or Demonstrated Intensities, allowing each User to adjust their messaging accordingly (such as, "cool down" or to try to raise overall intensity) or through Comparative Indicators (discussed below). From 632 and 634, data flow 600 proceeds to 636.

At 636, an Intensity Comparator (for example, Intensity Comparator 126) determines Comparative Indicators. In some implementations, the Comparative Indicators can be cues, including visual, auditory, and/or haptic cues, that make apparent or hint to a user the degree of the User1 Intended Intensity, User1 Demonstrated Intensity, User2 Intended Intensity, and/or User2 Demonstrated Intensity are congruent or incongruent. Continuing with the previous example where 30 is the User1 Intended Intensity and 20 is the User1 Demonstrated Intensity, the near congruence of these intensities can be indicated with a star or other graphic symbol appearing on the ESK 114 and pulsing vibrations.

FIG. 6C is a block diagram illustrating a continuation of FIGS. 6A and 6B of the data flow 600 in the ESS 100, particularly for retraining the Memory-based Predictor Models, according to an implementation of the present disclosure.

In FIG. 6C, the ESS 100 includes operations related to User1 Intended Intensity 606, Text Input (Clean Text) 602, User1 Demonstrated Intensity 612, an Anonymizer 638, Anonymized Input Text Stored with Intensity Scores 640, and Memory-based predictor Models (Re-trained) 642.

At 638, an Anonymizer receives the User1 Intended Intensity, Text Input, and User 1 Demonstrated Intensity from 606, 602, and 612, respectively. The Anonymizer anonymizes the Text Input and User1 Intended Intensity and User1 Demonstrated Intensity so as to prevent identification of User1. From 638, data flow 600 proceeds to 640.

At 640, the anonymized Text Input is stored (for example, in a database) with the associated (and anonymized) Intended Intensity and Demonstrated Intensity values. From 640, data flow 600 proceeds to 642.

At 642, the Memory-based Predictor Models are re-trained and updated for future use.

Figure 7:
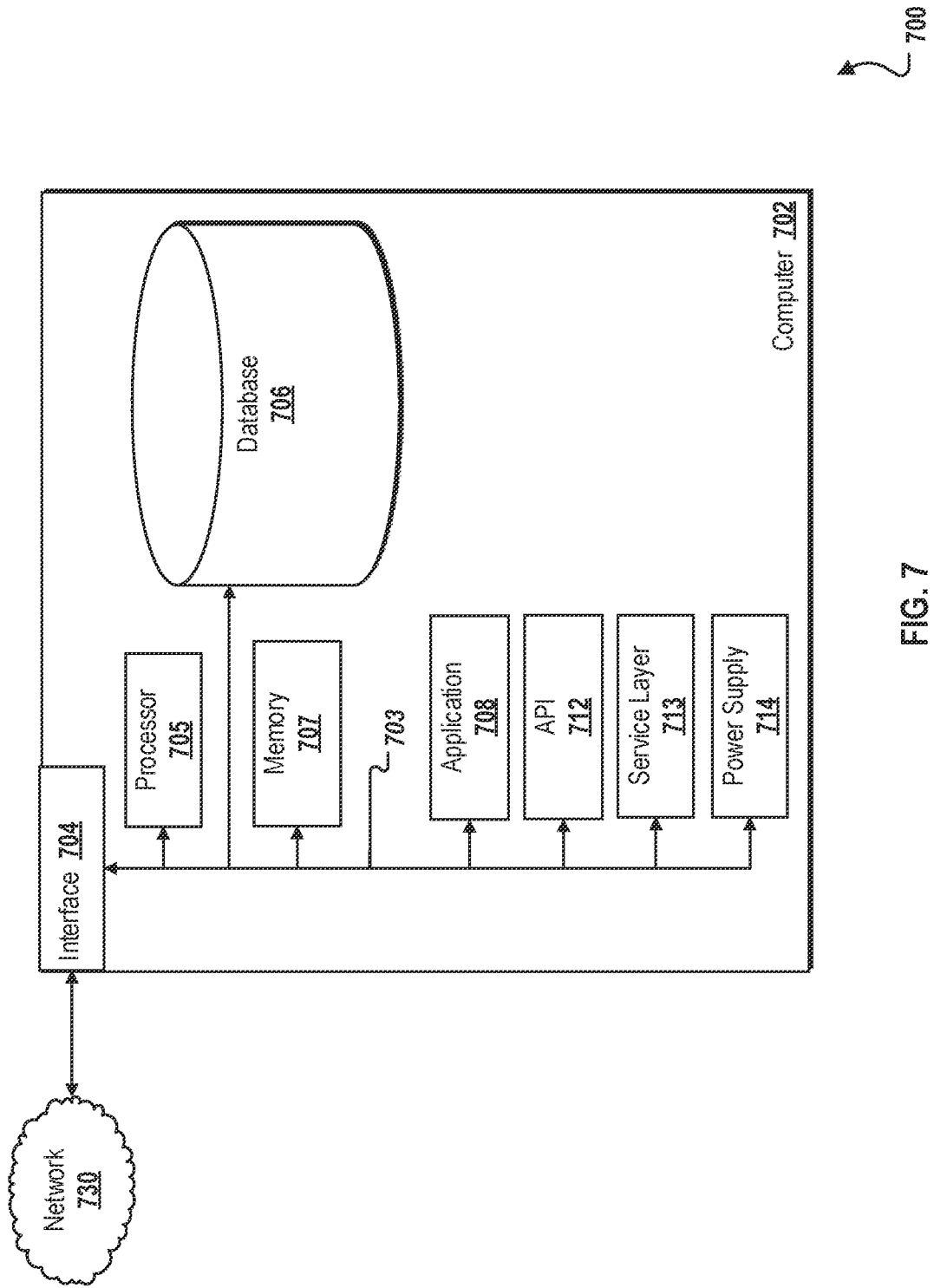
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 702 can include an input device, such as a keypad, keyboard, or touch screen, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as, for example, a client, network component, a server, or a database or another persistency, or a combination of roles for performing the subject matter described in the present disclosure. The illustrated Computer 702 is communicably coupled with a Network 730. In some implementations, one or more components of the Computer 702 can be configured to operate within an environment, or a combination of environments, including cloud-computing, local, or global.

At a high level, the Computer 702 is an electronic computing device operable to receive, transmit, process, store, or manage data and information associated with the described subject matter. According to some implementations, the Computer 702 can also include or be communicably coupled with a server, such as an application server, e-mail server, web server, caching server, or streaming data server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory or conventional database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702. The Database 706 can hold and operate on at least any data type mentioned or any data type consistent with this disclosure.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Described implementations of the subject matter can include one or more features, alone or in combination.

For example, in a first implementation, a computer-implemented method, comprising: receiving text input from an enhanced suggestive keyboard executing on a mobile computing device; generating, by dividing the text input, one or more tokens; generating, as generated token values, a value corresponding to each known token of the one or more tokens; determining, based on the generated token values, model inputs; determining, using a corpus discriminator, how likely it is that the model inputs originate from or approximate a particular corpus; evaluating, using a set of memory-based predictor models, an intended intensity, a demonstrated intensity, and the model inputs, the model inputs against a particular memory-based predictor model for each of the intended intensity and the demonstrated intensity; and displaying, using the enhanced suggestive keyboard, one or more intended intensity suggestions of a set of intended intensity suggestions or one or more demonstrated intensity suggestions of a set of demonstrated intensity suggestions.

The foregoing and other described implementations can each, optionally, include one or more of the following features:

A first feature, combinable with any of the following features, wherein the intended intensity is set using the enhanced suggestive keyboard.

A second feature, combinable with any of the previous or following features, comprising: determining, based on the intended intensity, intended intensity indictors; and updating a user interface on the enhanced suggestive keyboard using the intended intensity indicators.

A third feature, combinable with any of the previous or following features, comprising: determining, using the corpus discriminator and the model inputs, the demonstrated intensity.

A fourth feature, combinable with any of the previous or following features, comprising: determining that the text input matches a keyword in a keyword library; and displaying, using the enhanced suggestive keyboard and based on the intended intensity and the determining that the text input matches a keyword in a keyword library, one or more tips/recommendations.

A fifth feature, combinable with any of the previous or following features, comprising: determining a set of intended intensity probabilities; and determining a set of intended intensity model outputs.

A sixth feature, combinable with any of the previous or following features, comprising: determining a set of demonstrated intensity probabilities; and determining a set of demonstrated intensity model outputs.

In a second implementation, a non-transitory, computer-readable medium storing one or more instructions executable by a computer system to perform one or more operations, comprising: receiving text input from an enhanced suggestive keyboard executing on a mobile computing device; generating, by dividing the text input, one or more tokens; generating, as generated token values, a value corresponding to each known token of the one or more tokens; determining, based on the generated token values, model inputs; determining, using a corpus discriminator, how likely it is that the model inputs originate from or approximate a particular corpus; evaluating, using a set of memory-based predictor models, an intended intensity, a demonstrated intensity, and the model inputs, the model inputs against a particular memory-based predictor model for each of the intended intensity and the demonstrated intensity; and displaying, using the enhanced suggestive keyboard, one or more intended intensity suggestions of a set of intended intensity suggestions or one or more demonstrated intensity suggestions of a set of demonstrated intensity suggestions.

The foregoing and other described implementations can each, optionally, include one or more of the following features:

A first feature, combinable with any of the following features, wherein the intended intensity is set using the enhanced suggestive keyboard.

A second feature, combinable with any of the previous or following features, comprising: determining, based on the intended intensity, intended intensity indictors; and updating a user interface on the enhanced suggestive keyboard using the intended intensity indicators.

A third feature, combinable with any of the previous or following features, comprising: determining, using the corpus discriminator and the model inputs, the demonstrated intensity.

A fourth feature, combinable with any of the previous or following features, comprising: determining that the text input matches a keyword in a keyword library; and displaying, using the enhanced suggestive keyboard and based on the intended intensity and the determining that the text input matches a keyword in a keyword library, one or more tips/recommendations.

A fifth feature, combinable with any of the previous or following features, comprising: determining a set of intended intensity probabilities; and determining a set of intended intensity model outputs.

A sixth feature, combinable with any of the previous or following features, comprising: determining a set of demonstrated intensity probabilities; and determining a set of demonstrated intensity model outputs.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: receiving text input from an enhanced suggestive keyboard executing on a mobile computing device; generating, by dividing the text input, one or more tokens; generating, as generated token values, a value corresponding to each known token of the one or more tokens; determining, based on the generated token values, model inputs; determining, using a corpus discriminator, how likely it is that the model inputs originate from or approximate a particular corpus; evaluating, using a set of memory-based predictor models, an intended intensity, a demonstrated intensity, and the model inputs, the model inputs against a particular memory-based predictor model for each of the intended intensity and the demonstrated intensity; and displaying, using the enhanced suggestive keyboard, one or more intended intensity suggestions of a set of intended intensity suggestions or one or more demonstrated intensity suggestions of a set of demonstrated intensity suggestions.

The foregoing and other described implementations can each, optionally, include one or more of the following features:

A first feature, combinable with any of the following features, wherein the intended intensity is set using the enhanced suggestive keyboard.

A second feature, combinable with any of the previous or following features, comprising: determining, based on the intended intensity, intended intensity indictors; and updating a user interface on the enhanced suggestive keyboard using the intended intensity indicators.

A third feature, combinable with any of the previous or following features, comprising: determining, using the corpus discriminator and the model inputs, the demonstrated intensity.

A fourth feature, combinable with any of the previous or following features, comprising: determining that the text input matches a keyword in a keyword library; and displaying, using the enhanced suggestive keyboard and based on the intended intensity and the determining that the text input matches a keyword in a keyword library, one or more tips/recommendations.

A fifth feature, combinable with any of the previous or following features, comprising: determining a set of intended intensity probabilities; and determining a set of intended intensity model outputs.

A sixth feature, combinable with any of the previous or following features, comprising: determining a set of demonstrated intensity probabilities; and determining a set of demonstrated intensity model outputs.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving text input from an enhanced suggestive keyboard executing on a mobile computing device;
   generating, by dividing the text input, one or more tokens;
   generating, as generated token values, a value corresponding to each known token of the one or more tokens;
   determining, based on the generated token values, model inputs;
   determining, using a corpus discriminator, a demonstrated intensity, wherein the demonstrated intensity is a probability of how likely it is that the model inputs originate from or approximate a particular corpus;
   evaluating, using a set of memory-based predictor models, an intended intensity, the demonstrated intensity, and the model inputs, the model inputs against a particular memory-based predictor model for each of the intended intensity and the demonstrated intensity;
   displaying, using the enhanced suggestive keyboard, a demonstrated intensity indicator representing the demonstrated intensity in relation to the intended intensity represented by an intended intensity indicator, wherein the demonstrated intensity indicator dynamically changes based on addition or removal of the one or more tokens; and
   displaying, using the enhanced suggestive keyboard, one or more intended intensity suggestions of a set of intended intensity suggestions or one or more demonstrated intensity suggestions of a set of demonstrated intensity suggestions.

2. The computer-implemented method of claim 1, wherein the intended intensity is set using the enhanced suggestive keyboard.

3. The computer-implemented method of claim 1, comprising:
   determining, based on the intended intensity, an intended intensity indicator; and
   updating the enhanced suggestive keyboard using the intended intensity indicator.

4. The computer-implemented method of claim 1, wherein the demonstrated intensity is determined by the corpus discriminator using the model inputs.

5. The computer-implemented method of claim 1, comprising:
   determining that the text input matches a keyword in a keyword library; and
   displaying, using the enhanced suggestive keyboard and based on the intended intensity and the determining that the text input matches a keyword in a keyword library, one or more tips/recommendations.

6. The computer-implemented method of claim 1, comprising:
   determining a set of intended intensity probabilities; and
   determining a set of intended intensity model outputs.

7. The computer-implemented method of claim 1, comprising:
   determining a set of demonstrated intensity probabilities; and
   determining a set of demonstrated intensity model outputs.

8. A non-transitory, computer-readable medium storing one or more instructions executable by a computer system to perform one or more operations, comprising:
   receiving text input from an enhanced suggestive keyboard executing on a mobile computing device;
   generating, by dividing the text input, one or more tokens;
   generating, as generated token values, a value corresponding to each known token of the one or more tokens;
   determining, based on the generated token values, model inputs;
   determining, using a corpus discriminator, a demonstrated intensity, wherein the demonstrated intensity is a probability of how likely it is that the model inputs originate from or approximate a particular corpus;
   evaluating, using a set of memory-based predictor models, an intended intensity, the demonstrated intensity, and the model inputs, the model inputs against a particular memory-based predictor model for each of the intended intensity and the demonstrated intensity;
   displaying, using the enhanced suggestive keyboard, a demonstrated intensity indicator representing the demonstrated intensity in relation to the intended intensity represented by an intended intensity indicator, wherein the demonstrated intensity indicator dynamically changes based on addition or removal of the one or more tokens; and
   displaying, using the enhanced suggestive keyboard, one or more intended intensity suggestions of a set of intended intensity suggestions or one or more demonstrated intensity suggestions of a set of demonstrated intensity suggestions.

9. The non-transitory, computer-readable medium of claim 8, wherein the intended intensity is set using the enhanced suggestive keyboard.

10. The non-transitory, computer-readable medium of claim 8, comprising:

determining, based on the intended intensity, an intended intensity indicator; and updating the enhanced suggestive keyboard using the intended intensity indicator.

11. The non-transitory, computer-readable medium of claim 8, wherein the demonstrated intensity is determined by the corpus discriminator using the model inputs.

12. The non-transitory, computer-readable medium of claim 8, comprising:

determining that the text input matches a keyword in a keyword library; and displaying, using the enhanced suggestive keyboard and based on the intended intensity and the determining that the text input matches a keyword in a keyword library, one or more tips/recommendations.

13. The non-transitory, computer-readable medium of claim 8, comprising:

determining a set of intended intensity probabilities; and determining a set of intended intensity model outputs.

14. The non-transitory, computer-readable medium of claim 8, comprising:

determining a set of demonstrated intensity probabilities; and determining a set of demonstrated intensity model outputs.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

receiving text input from an enhanced suggestive keyboard executing on a mobile computing device;

generating, by dividing the text input, one or more tokens;

generating, as generated token values, a value corresponding to each known token of the one or more tokens;

determining, based on the generated token values, model inputs;

determining, using a corpus discriminator, a demonstrated intensity, wherein the demonstrated intensity is a probability of how likely it is that the model inputs originate from or approximate a particular corpus;

evaluating, using a set of memory-based predictor models, an intended intensity, the demonstrated intensity, and the model inputs, the model inputs against a particular memory-based predictor model for each of the intended intensity and the demonstrated intensity;

displaying, using the enhanced suggestive keyboard, a demonstrated intensity indicator representing the demonstrated intensity in relation to the intended intensity represented by an intended intensity indicator, wherein the demonstrated intensity indicator dynamically changes based on addition or removal of the one or more tokens; and displaying, using the enhanced suggestive keyboard, one or more intended intensity suggestions of a set of intended intensity suggestions or one or more demonstrated intensity suggestions of a set of demonstrated intensity suggestions.

16. The computer-implemented system of claim 15, wherein the intended intensity is set using the enhanced suggestive keyboard.

17. The computer-implemented system of claim 15, comprising:

determining, based on the intended intensity, an intended intensity indicator; and updating the enhanced suggestive keyboard using the intended intensity indicator.

18. The computer-implemented system of claim 15, wherein the demonstrated intensity is determined by the corpus discriminator using the model inputs.

19. The computer-implemented system of claim 15, comprising:

determining that the text input matches a keyword in a keyword library; and displaying, using the enhanced suggestive keyboard and based on the intended intensity and the determining that the text input matches a keyword in a keyword library, one or more tips/recommendations.

20. The computer-implemented system of claim 15, comprising:

determining a set of intended intensity probabilities; and determining a set of intended intensity model outputs.

* * * * *